No. 744,543. Patented November 17, 1903.

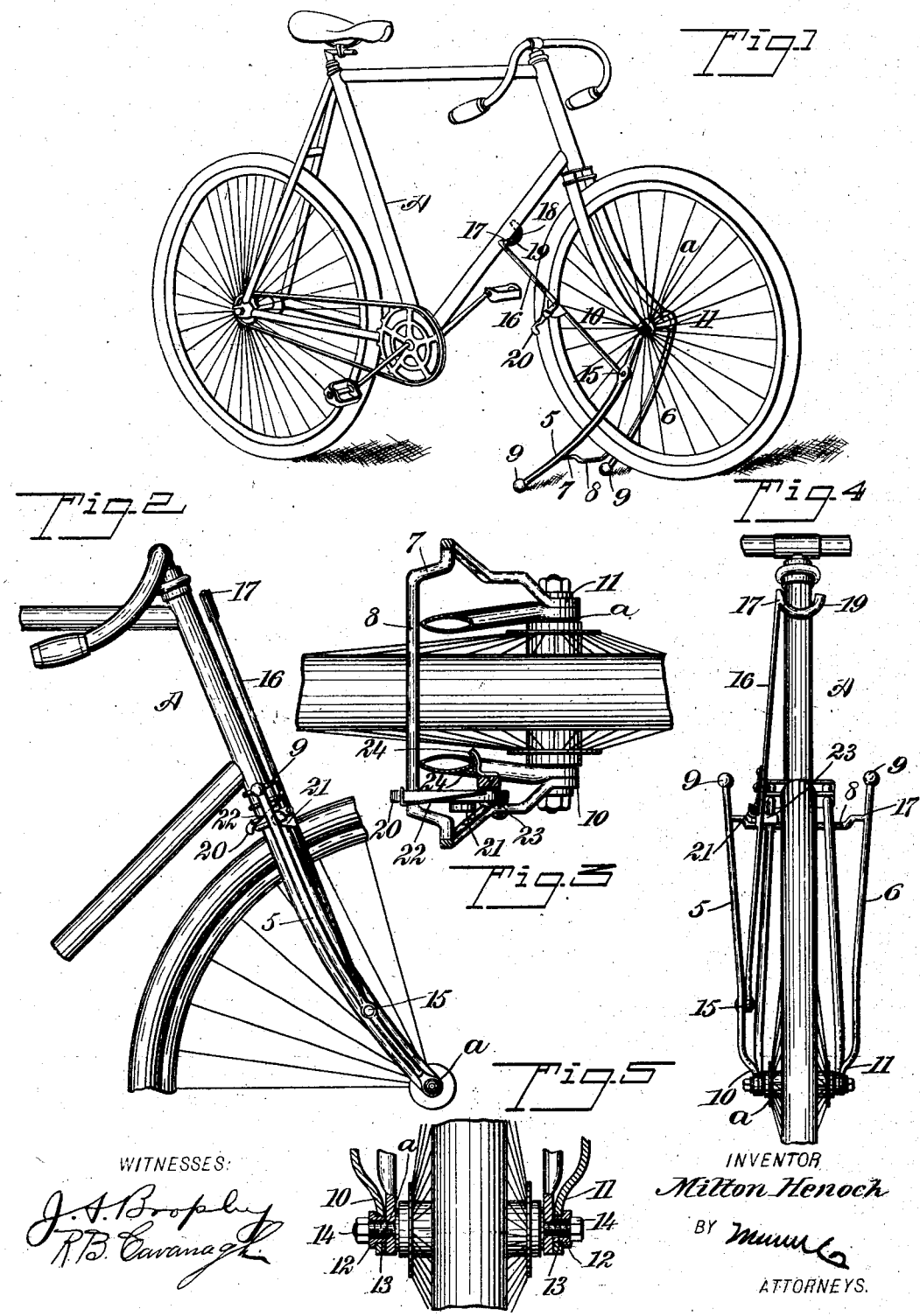

UNITED STATES PATENT OFFICE.

MILTON HENOCH, OF LAPORTE, INDIANA.

BICYCLE-SUPPORT.

SPECIFICATION forming part of Letters Patent No. 744,543, dated November 17, 1903.

Application filed April 18, 1903. Serial No. 153,229. (No model.)

*To all whom it may concern:*

Be it known that I, MILTON HENOCH, a citizen of the United States, and a resident of Laporte, in the county of Laporte and State of Indiana, have invented new and useful Improvements in Bicycle-Supports, of which the following is a full, clear, and exact description.

The present invention relates to certain novel and useful improvements in bicycle-supports, and has particular application to a portable support designed to be attached to the front of the machine.

In carrying out my invention I have particularly in view the construction of a device of the class described which when secured to the front axle of the machine will act in conjunction with the back wheel of the bicycle to form a three-point or tripod support for the wheel. It has been found by practical experience that the majority of the bicycle-supports now in use which support the wheel upright at four points have a tendency to permit the wheel to rock when the latter is placed upon an uneven surface, such as hilly or rugged ground, thereby presenting an inclination toward the overturning of the wheel when the support is subjected to a jar or shock; but by elevating the front wheel slightly from the ground and providing a three-point support formed, as above stated, by the two arms of my device and the rear wheel of the machine this tendency of the bicycle to overturn is obviated.

A further object of the present invention is to provide a support which will be exceedingly simple and durable in its construction, one which will be composed of comparatively few parts, and which may be manufactured and sold at but very little expense.

A further object of the invention is to provide a support which may be readily attached to the axle of the front wheel, such support being adapted when not in use to be folded up against the front portion of the machine.

With the above-recited and other objects of a similar nature in view the invention consists in the construction, combination, and arrangement of parts, as is described in this specification, delineated in the accompanying drawings, and set forth in the appended claims.

Reference is to be had to the accompanying drawings, forming a part of this specification, in which similar characters of reference indicate corresponding parts in all the figures.

Figure 1 is a perspective view of a bicycle sustained in an upright position by my improved support. Fig. 2 is a side view of the front portion of a bicycle, embracing the front fork and a portion of the front wheel and showing the manner of folding my support against the fork of the bicycle when such support is not in use. Fig. 3 is a transverse sectional view taken through the front fork of the bicycle, illustrating the manner in which the support is locked when in its folded position and bearing against said front fork. Fig. 4 is a front view of a portion of a bicycle having my support applied thereto and in a folded non-operative position; and Fig. 5 is a detail view of a portion of the front wheel of a bicycle, showing the manner of securing the arms of the support to the front axle, a part of said view being in section.

Referring to the accompanying drawings in detail, A designates a bicycle of an ordinary and well-known type to the front axle $a$ of which is adapted to be secured my improved support. This support consists of a main frame comprising two arms or members 5 and 6, which members diverge slightly and are connected through the medium of a crossbar 7, formed with a central bend or loop 8 to conform to the contour of the front fork of the machine when the support is resting against the same. The outer ends of the arms or members 5 and 6—that is to say, the ends which rest upon the ground—are provided with bearing knobs or shoes 9 9, which may be formed of any preferred material, such as metal, wood, rubber, or the like. The opposite ends of the arms are bent slightly inward and flattened, as shown at 10 and 11, said flattened portions being apertured to permit their fitting over the ends of the axle of the front wheel after the nuts have been removed therefrom. The manner of securing the arms of the frame to the front axle is clearly shown in the drawings, particularly in Figs. 3, 4, and 5, the flattened portions 10 and 11 of said arms being secured at opposite ends of the axle outside of the main fork of the machine. In order to hold the arms in this position, I have provided a washer of the type shown at 12, said washer having an annular collar 13 formed thereon, said collar being of less diameter than the main portion of the washer, the construction being such that when the washer is screwed upon the end of the axle the collar portion thereof will extend through the aperture in the arm of the supporting-frame and bear against the end of the front fork of the machine, as clearly shown in Fig. 5. An ordinary nut 14 is then screwed on each end of the axle, the result being that the parts will be bound or held securely in position.

To one of the arms of the support, in the present instance the arm 5, there is pivoted, as at 15, a relatively long supporting-arm or brace-rod 16, the pivot-point being preferably near the flattened end portion of the aforesaid arm. The free extremity of the brace-rod 16 is bent at approximately right angles to the main portion of the arm, as at 17, said bent portion being curved to an approximately semicircular shape, as shown at 18, and is covered with a buffer 19 of any suitable material, such as rubber or the like, the curved end portion of the arm being adapted to bear against the lower bar of the frame of the wheel when the device is in its operative position. Approximately centrally of this brace-rod 16 is pivoted a latching-hook 20, adapted when the device is in its folded non-operative position to engage with the bent or curved portion 8 of the cross-bar 7 and hold the brace-arm in a coupled or locked position therewith. A guiding and limiting lug 21 is secured to the brace-rod immediately below the hook, the function of said lug being to support the hook horizontally against the tension of the spring 22, which spring is designed to press and hold the latching-hook into engagement with the cross-bar of the support, thus preventing the hook being disengaged by jars or shocks when the wheel is being ridden.

To the opposite side of the brace-rod from that to which the hook is pivoted is secured a laterally-extending curved tongue 23, having at 24 a layer of soft material—such as rubber, cloth, or the like—this curved tongue portion being adapted to bear against the adjacent member of the front fork of the machine.

From the above description, taken in connection with the accompanying drawings, the construction and operation of my improved support will be readily understood. To adjust the device to the bicycle, it is only necessary to remove the nuts and washers from the front axle and secure the device to the latter, as heretofore described. When using the support, the arms 5 and 6 are folded downward until they come in contact with the ground back of the front wheel. The brace-rod is then moved in an upward direction along the lower tube or bar of the frame until the front wheel is lifted from the ground. The bicycle will then be standing upon the arms 5 and 6 and the back wheel, which adjustment not only supports the bicycle in a firm upright position, but holds the latter so that it can neither be forced forward or backward, thus rendering the support applicable at any degree of inclination. If it is desired to fold and adjust the support when the bicycle is in use, the brace-rod is folded downward until the front wheel again rests on the ground and the brace-rod is folded against the cross-rod of the arms 5 and 6, which are in turn brought into a position along the line of the bicycle-fork. The brace-rod is locked to the cross-bar and connected to the arms through the medium of the latch heretofore described, and the covered tongue 23, bearing against the fork of the machine, prevents scratching or rubbing of the same by the parts of the support.

While I have shown and herein described one particular embodiment of my invention, it is of course to be understood that I do not limit myself to the precise details of construction shown herein, as there may be modifications and variations in certain respects without departing from the essential features of the invention or sacrificing any of the advantages thereof.

Having thus described my invention, I claim as new and desire to secure by Letters Patent—

1. A bicycle-support, comprising supporting arms or members, a relatively long brace-rod pivoted to said members, the free end of said rod being curved to form a bearing portion for the frame of a bicycle, and a tongue formed on said rod adapted to contact with a member of the front fork of a bicycle when the rod is in its non-operative folded position, substantially as set forth.

2. A bicycle-support comprising supporting-arms adapted to be secured to the front axle of a bicycle, a relatively long brace-rod having a curved end portion, said rod being adapted to be secured to one of said arms, a latch for locking the brace-rod in a folded position against said arms, a tension-spring for said latch, and a curved tongue portion secured to said brace-rod, adapted to bear against the front fork of a bicycle when the support is in its inoperative position, substantially as set forth.

3. A bicycle-support comprising supporting-arms or members having apertures therein for securing the support to the front-wheel axle of the bicycle, and means for pivotally locking the arms on the axle, said means comprising a washer for the apertured portion of each arm, said washer having an annular flange formed thereon, and a nut adapted to be screwed upon the end of the axle and bear
5 against the flange of the washer, substantially as set forth.

In testimony whereof I have signed my name to this specification in the presence of two subscribing witnesses.

MILTON HENOCH.

Witnesses:
   A. E. GAUL,
   GEORGE I. WANNER.